United States Patent [19]

Carter

[11] Patent Number: 6,067,716
[45] Date of Patent: May 30, 2000

[54] PLASTIC PIPE CUTTER

[76] Inventor: Sam W. Carter, 4170 Indian Hills Tr., West Branch, Mich. 48661

[21] Appl. No.: 09/277,501

[22] Filed: Mar. 26, 1999

[51] Int. Cl.[7] ............................................... B26D 7/02
[52] U.S. Cl. ................................................. 30/92; 30/378
[58] Field of Search ............................... 30/92, 371, 373, 30/378, 392, 393, 124, 278, 286, 289

[56] References Cited

U.S. PATENT DOCUMENTS

| | | |
|---|---|---|
| 2,568,791 | 9/1951 | Cooper . |
| 3,481,374 | 12/1969 | Schindler . |
| 3,763,733 | 10/1973 | Jambor . |
| 3,805,383 | 4/1974 | McNally ........................................ 30/92 |
| 3,834,019 | 9/1974 | Smeltzer et al. ............................ 30/92 |
| 4,051,597 | 10/1977 | Cardoza . |
| 4,566,190 | 1/1986 | Isakson . |
| 4,747,212 | 5/1988 | Cavdek ........................................ 30/92 |
| 4,876,793 | 10/1989 | Quaglia . |
| 5,179,781 | 1/1993 | Weaver . |
| 5,611,146 | 3/1997 | Ducret . |
| 5,806,187 | 9/1998 | Ducret . |

*Primary Examiner*—Hwei-Siu Payer
*Attorney, Agent, or Firm*—Reising, Ethington, Barnes, Kisselle, Learman & McCulloch P.C.

[57] ABSTRACT

The pipe cutter attachment has a way mounted on a portable power saw with a reciprocating saw blade. The way is mounted on the power saw by an attaching assembly that accommodates the power saw that is used. A pipe holder block is slidably supported by the way. A pipe receiving slot with an open end is formed in the pipe holder block. The saw blade is in a saw blade slot in the pipe holder block. During cutting of a pipe the saw blade moves into the pipe receiving slot, engages a pipe to be cut and moves toward the open end of the pipe receiving slot. A resilient member urges the pipe holder block toward a position in which the saw blade is in the pipe holder block and ready to engage and cut a pipe seated in the pipe receiving slot.

8 Claims, 3 Drawing Sheets

PLASTIC PIPE CUTTER

This invention relates to a plastic pipe cutter, and more particularly to a portable power saw for cutting plastic pipe.

BACKGROUND OF THE INVENTION

Plastic pipe is cut by various types of saws. Band saws make reasonably straight cuts. However, band saws are not easily transported to work sites. Hand saws are capable of cutting plastic pipe, but require substantial effort to make straight cuts that are perpendicular to the axis of the pipe. Hand saws are also slow. Powered portable saws of various types are available on job sites. These power saws are generally fast, but make cuts that are not square with the axis of the pipe.

Plastic pipes are used in water supply systems and sewer systems. Water systems and sewage systems both employ plastic pipes with relatively thick walls. Plastic pipes with thick walls are connected together with molded couplings and fittings such as elbows and tees, and adhesives. These fittings generally have internal projections that limit the distance the end of a pipe can be inserted into the fitting. If the cut end surface of a pipe is not in a plane that is perpendicular to the pipe's center line, portions of the end of the pipe cannot be inserted as far into the fitting as required to form a strong joint without leaks. Weak joints may leak the first time they convey a fluid. There is also a chance that weak joints will hold fluids initially but fail later. Unexpected failures and leaks may cause substantial damage.

Plastic pipes are also used for pneumatic systems. These plastic pipes generally have relatively thin walls. Plastics used to make such pipes are semi-rigid. Like the thick walled pipes, molded couplers and fittings are used. Adhesives secure the pipes to the couplers and fittings. Leaks in a pipe system for a central vacuum system, for example, will add air into the system, thereby reducing the effectiveness of the system. Such leaks in a vacuum system are difficult to locate, even if the pipes are accessible. It is therefore imperative that strong joints without leaks be formed.

SUMMARY OF THE INVENTION

The plastic pipe cutter attachment for portable power saws has a way member that is secured to the housing of the saw. The way member includes an attachment assembly for attaching the way member to the saw housing. This attachment assembly is made to accommodate the saw to which the way is attached. A saw blade passage is provided through the way for the passage of a reciprocating saw blade driven by the power saw. A pipe holder block is slidably mounted on the way for movement relative to the way along a line. A block stop surface on the pipe holder block contacts a stop surface on the way to limit movement of the block in one direction. A pipe receiving slot with a pair of side walls, a slot base, and an open end is formed in the block. A block base is integral with the side walls of the pipe receiving slot and adjacent to the slot base. A saw blade passage extends through the block from the open end of the pipe receiving slot through the lower portion of the base.

Resilient tension members are attached to the way and to the pipe holder block. These tension members urge the block stop surface toward the way stop surface and the pipe cut beginning position. In the pipe cut beginning position, the saw blade is in the portion of the saw blade slot in the block base, out of the pipe receiving slot and has teeth on its edge facing the open end of the pipe receiving slot.

A workpiece mark observation aperture is provided through the base in line with the saw blade and the center of the pipe receiving slot. The observation aperture permits observation of a mark on a pipe where the pipe is to be cut.

Side walls of the pipe receiving slot in the pipe holder block may be provided with steps to accommodate pipes with two or more diameters. A small diameter pipe would be received on the slot base in the pipe holder block. A larger diameter pipe contacts steps in the side walls and is spaced from the slot base.

Teeth members may be secured to the pipe holding block to prevent rotation of pipes while they are being cut. The tips of the teeth engage a pipe in the pipe receiving slot in a position to be cut, and hold the pipe from rotating about its axis while being cut. By holding some pipes from rotating, the time required to cut a pipe can be reduced.

During the cutting operation, the pipe holder block holds a pipe that is being cut in a fixed position relative to the path of movement of the saw blade. The resilient member holds the pipe holder block in contact with the pipe being cut. After a pipe is cut, the resilient member returns the pipe holder block to the starting position with the block stop surface in engagement with the way stop surface.

THE DRAWINGS

The presently preferred embodiment of the invention is disclosed in the following description and in the accompanying drawings, wherein.

DESCRIPTION OF THE PREFERRED EMBODIMENTS

Figure 1:
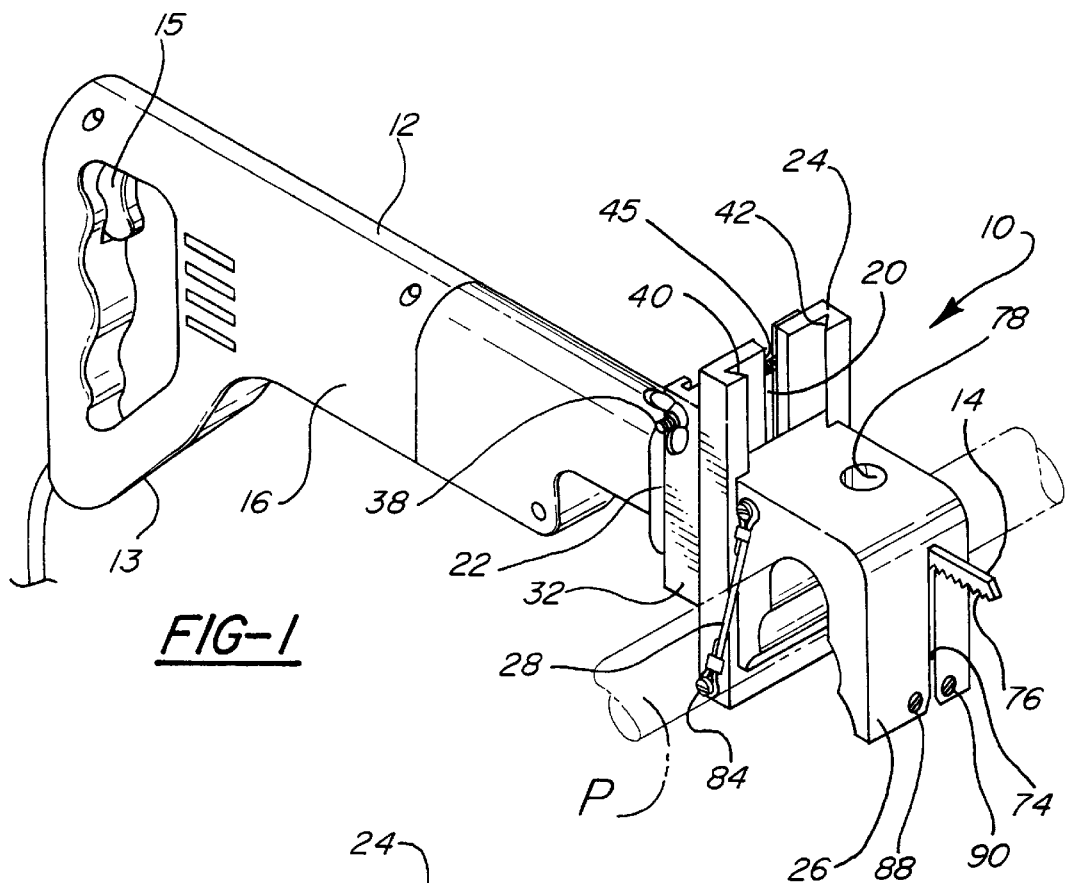
FIG. 1 is a perspective view of a plastic pipe cutter attachment with an attached power saw.
Figure 2:
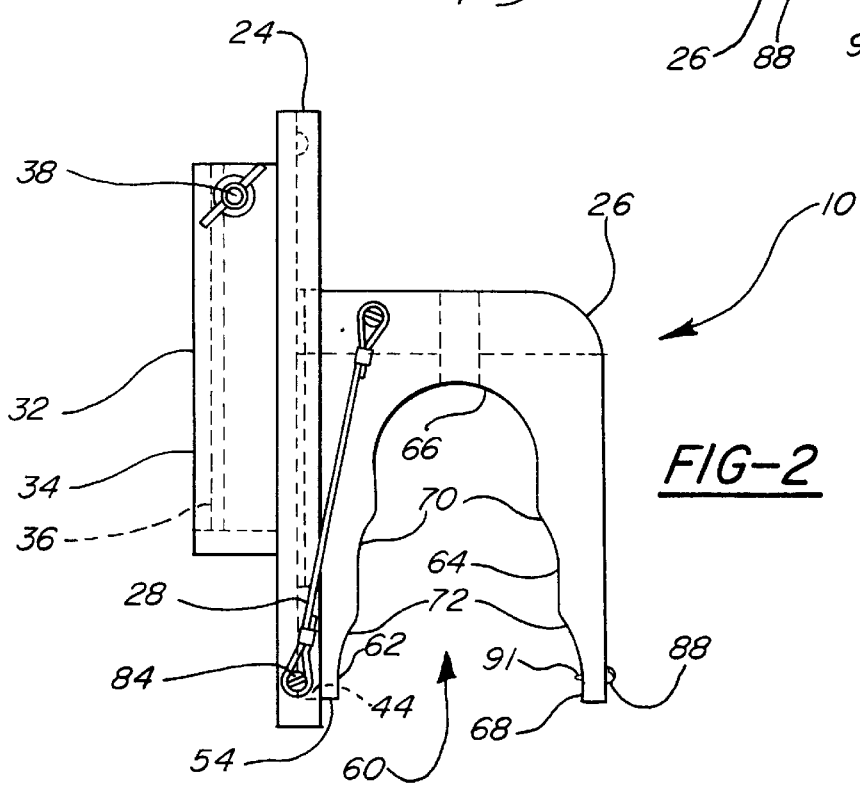
FIG. 2 is an enlarged side elevational view of the plastic pipe cutter attachment.
Figure 3:
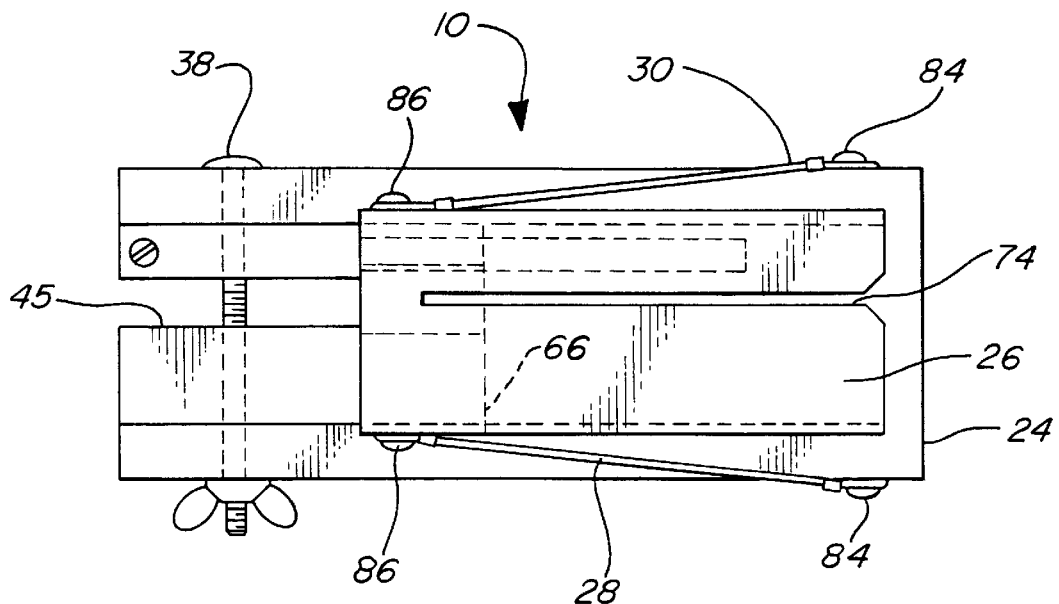
FIG. 3 is an enlarged end elevational view of the plastic pipe cutter attachment.
Figure 4:
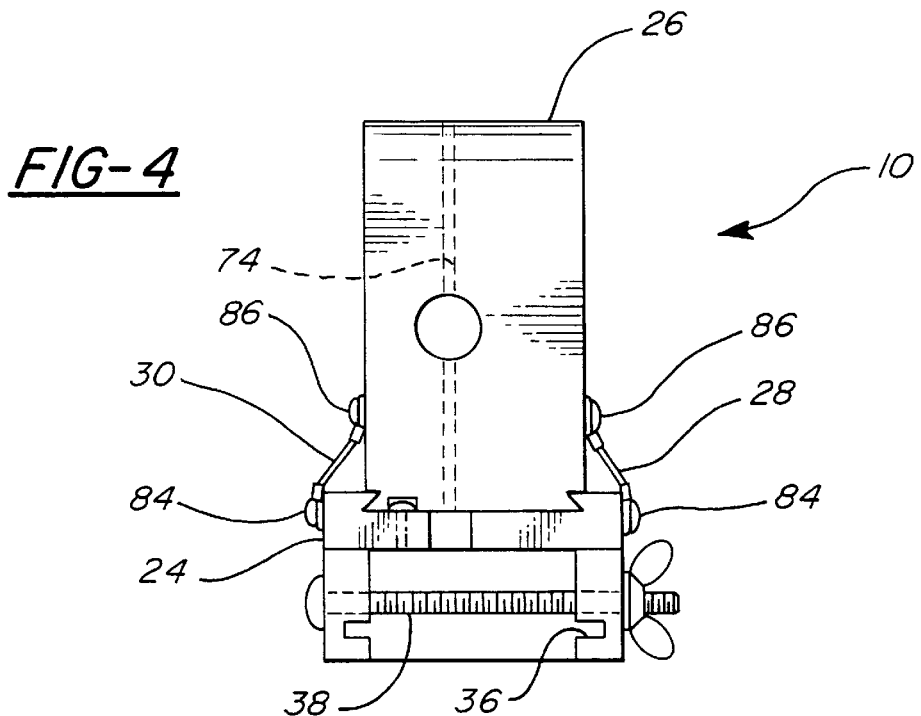
FIG. 4 is a top plan view of the plastic pipe cutter attachment.
Figure 5:
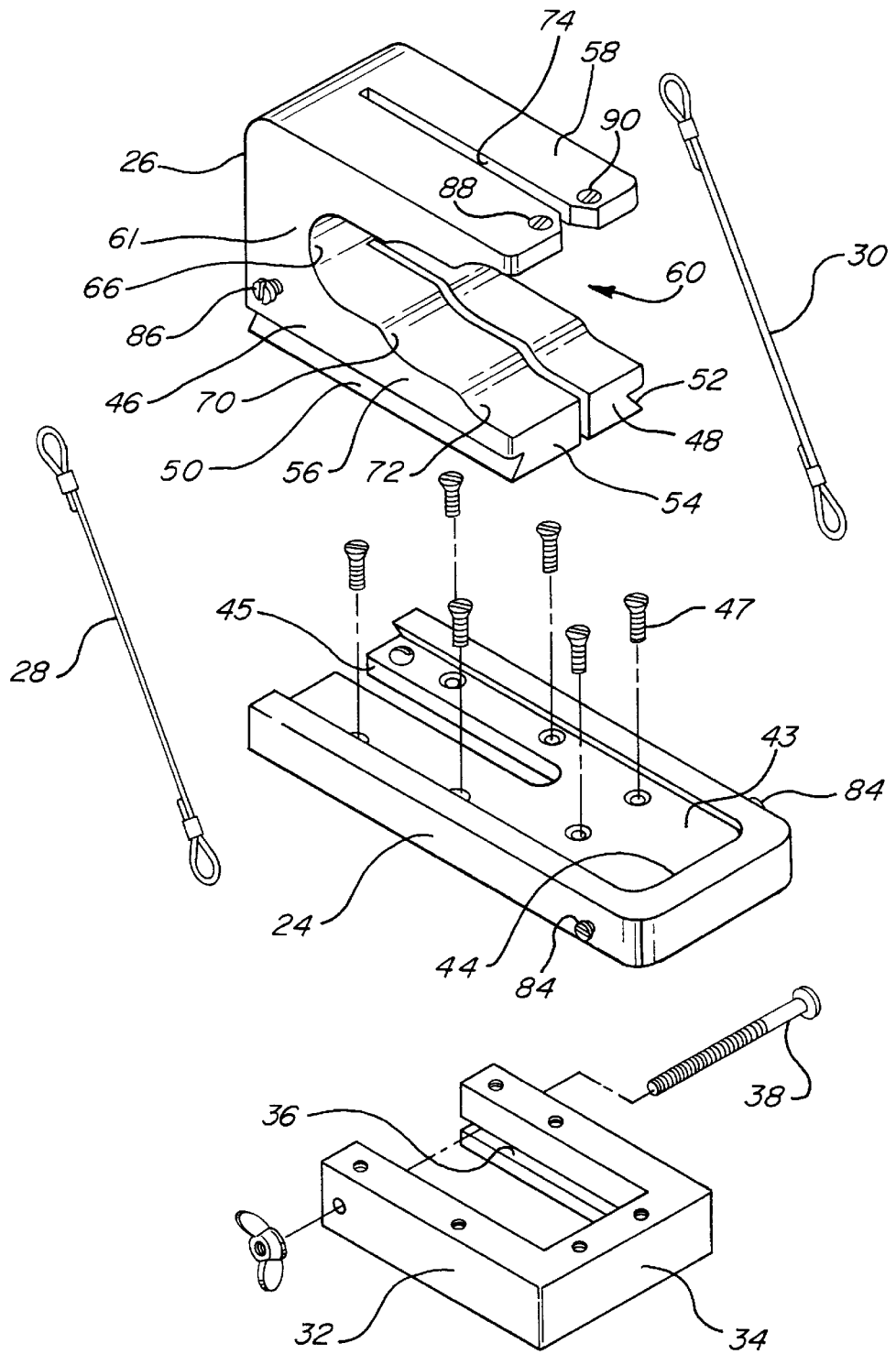
FIG. 5 is an expanded view of the plastic pipe cutter attachment.

The pipe cutter attachment generally designated 10 is attached to a portable power saw 12 to maintain alignment between a pipe to be cut and a saw blade 14. The power saw 12 includes a housing 16, a handle 13, a switch 15, a reciprocating saw blade holder, and a saw blade 14 that is clamped to the saw blade holder. The power saws include structures for mounting a shoe member to the housing 16. The power saw 12 shown in the drawing has a mount plate 20 on a pedestal 22 that is integral with the housing 16.

The pipe cutter attachment 10 has a way 24, a pipe holder block 26, and two resilient members 28 and 30. The way 24 has an attaching assembly 32 with a U-shaped frame 34. The U-shaped frame 34 has an internal groove 36 that receives three sides of the mount plate 20. A bolt 38 passes through the free end of both legs of the U-shaped frame 34 and secures the mount plate 20 in the groove 36. The attaching assembly 32 fits the power saw 12 of one manufacturer. To use the pipe cutter attachment 10 with a different manufacturer saw, a different attaching assembly 32 is required.

The way 24 is an elongated plate member with two spaced apart parallel surfaces 40 and 42 that form a mortise and defining a groove 43. The way 24 has a way stop surface 44 at one end. The way 24 also has a saw blade passage 45 that the saw blade 14 passes through. Screws 47 attach the way 24 to the attaching assembly 32.

The pipe holder block 26 has a base 46 with a tenon 48. The tenon 48 has engaging surfaces 50 and 52. This tenon 48 is received in the groove 43 defined by the surfaces 40 and 42 of the way 24, engage the engaging surfaces 50 and 52 of the pipe holder block 26 to hold the pipe holder block on the way, and to guide the pipe holder block along a line relative to the way. A block stop surface 54 engages the stop surface 44 to limit movement of the pipe holder block 26 relative to the way 24 in one direction.

A number of different structures can be used in place of the surfaces 40 and 42 on the way 24 and the engaging surfaces 50 and 52 on the pipe holder block 26 to guide and retain the pipe holder block. The way 24 could rotatably support two rows of grooved rollers and two parallel rails on the pipe holder block 26 could be received in the roller grooves. The way 24 could include a non-circular rod that is received in a passage through the pipe holder block 26 with a cross-sectional shape similar to the shape of the non-circular rod. Another possible construction would be a way with two parallel round bars and two bores through the pipe holder block that receive the round bars. These different structures for guiding and retaining the pipe holder block 26 could be reversed with the structures described as being part of the way 24 becoming part of the pipe holder block and the receiving structures becoming part of the way if desired.

The pipe holder block 26 has two parallel walls 56 and 58 that are integral with the base 46 and define a pipe receiving slot 60. The pipe receiving slot 60 has side walls 62 and 64, a slot base surface 66, and an open end 68. If desired, the slot 60 can have steps 70 in each side wall 62 and 64. A small diameter pipe sits on the slot base surface 66 while a larger diameter pipe engages the step 70 on each side of the slot 60 and is spaced from the base surface 66. If desired, additional steps 72 can be provided in the slot 60 for even larger diameter pipes.

A saw blade slot 74 is provided in the pipe holder block 26. This slot 74 extends through the side walls 56 and 58 and from the open end 68 of the pipe receiving slot 60 to a position within the slot base 61. When the pipe holder block 26 is in a position to start cutting a pipe P, the block stop surface 54 is in engagement with the way stop surface 44 and the saw blade 14 is in the portion of the saw blade slot 74 within the slot base 61. In this position, the saw blade 14 is outside the pipe receiving slot 60 and the saw blade teeth 76 face toward the open end 68 of the pipe receiving slot.

A workpiece observation aperture 78 extends through the base 46 of the pipe holder block 26. This aperture 78 is aligned with the saw blade 14 and the center of the pipe receiving slot 60. The aperture 78 permits observation of a mark on a pipe P indicating where the pipe is to be severed and alignment of the saw blade 14 with the mark.

A pair of tension springs 28 and 30 both have one of their ends anchored to the way 24 by pins 84 and their other ends anchored to the pipe holder block 26 by pins 86. These tension springs 28 and 30 urge the block stop surface 54 toward the way stop surface 44. While cutting a pipe, the tension springs 28 and 30 hold the pipe holder block 26 in contact with the pipe P. After the pipe is severed, the tension springs 28 and 30 return the pipe holder block 26 to the pipe cut beginning position with the way stop surface 44 in contact with the block stop surface 54.

The tension springs 28 and 30 are rubber bungee cords. These springs 28 and 30 could be replaced by coil springs, if desired. The tension springs could also be replaced by compression springs with changes to accommodate compression springs.

Screws 88 and 90, with sharp ends 91, screw into the pipe holder block 26. The sharp ends 91 of the screws 88 and 90 act as teeth which engage a pipe P, that is seated in the pipe receiving slots 60, to keep the pipe from rotating about its axis. By holding a pipe from rotating, the saw blade 14 cuts in two areas simultaneously, and reduces the total time required to sever a pipe.

The disclosed embodiment is representative of a presently preferred form of the invention, but is intended to be illustrative rather than definitive thereof. The invention is defined in the claims.

I claim:

1. A pipe cutter comprising a portable power saw having a housing and a reciprocating saw blade supported and driven by said portable power saw;

a way member having an attaching assembly secured thereto and attaching the way member to the housing, a saw blade passage through the way member, and a way stop surface on the way member;

a pipe holder block with a block way engaging structure in engagement with the way member operable to guide the pipe holder block along a line relative to the way member, a block stop surface engageable with the way stop surface to limit movement of the pipe holder block relative to the way member in one direction, a pipe receiving slot in the pipe holder block having a pair of side walls and a slot base surface, said pipe receiving slot extending from an open end of the pipe receiving slot to a pipe slot base of the pipe holder block, and a saw blade slot in said pipe holder block extending from the open end of the pipe receiving slot to a position in the pipe slot base; and a resilient member in engagement with the way member and the pipe holder block that urges the pipe holder block toward a pipe cut beginning position in which the block stop surface is in engagement with the way stop surface, the saw blade is in the portion of the saw blade slot in the pipe slot base with a plurality of saw blade teeth facing toward the open end of the pipe receiving slot and wherein the saw blade is withdrawn from the pipe receiving slot.

2. A pipe cutter as set forth in claim 1 including at least one pipe engaging tooth attached to the pipe holder block and projecting into the pipe receiving slot in a pipe engaging position.

3. A pipe cutter as set forth in claim 1 wherein the resilient member is a tension spring.

4. A pipe cutter as set forth in claim 3 including a second tension spring connected to the pipe holder block and to the way member.

5. A pipe cutter as set forth in claim 1 wherein the side walls of the pipe receiving slot have steps to accommodate at least two pipe diameters.

6. A pipe cutter as set forth in claim 1 wherein the saw blade moves toward the open end of the pipe receiving slot during pipe cutting.

7. A pipe cutter as set forth in claim 1 wherein the resilient member urges the pipe holder block toward a workpiece during cutting.

8. A pipe cutter as set forth in claim 1 including a workpiece mark observation aperture through the pipe slot base of the pipe holder block, in alignment with the saw blade and midway between the side walls of the pipe receiving slot.

* * * * *